United States Patent [19]

Dalrymple et al.

[11] Patent Number: 4,617,132

[45] Date of Patent: Oct. 14, 1986

[54] METHOD OF ALTERING THE PERMEABILITY OF A HYDROCARBON-CONTAINING SUBTERRANEAN FORMATION

[75] Inventors: Dwyann Dalrymple; Edward Vinson, both of Duncan, Okla.

[73] Assignee: Halliburton Company, Duncan, Okla.

[21] Appl. No.: 718,391

[22] Filed: Apr. 1, 1985

[51] Int. Cl.$^4$ .......................... C09K 3/00; E02D 3/12
[52] U.S. Cl. ................................. 252/8.554; 166/310; 405/263
[58] Field of Search .................. 405/263; 252/8.55 D; 166/310

[56] References Cited

U.S. PATENT DOCUMENTS

| | | | |
|---|---|---|---|
| 3,580,337 | 5/1971 | Gogarty et al. | 166/273 |
| 3,779,316 | 12/1973 | Bott | 166/276 |
| 3,783,944 | 7/1974 | Jennings et al. | 166/274 |
| 3,830,302 | 8/1974 | Dreher et al. | 166/294 |
| 4,064,940 | 12/1977 | Sparlin | 166/295 |
| 4,409,110 | 10/1983 | Borchardt et al. | 252/8.55 D |
| 4,444,262 | 4/1984 | Haskin et al. | 166/274 |
| 4,460,627 | 7/1984 | Weaver et al. | 427/212 |
| 4,485,020 | 11/1984 | Shay et al. | 252/8.55 D |
| 4,486,340 | 12/1984 | Glass, Jr. | 252/8.55 D |

*Primary Examiner*—Thurman K. Page
*Attorney, Agent, or Firm*—Robert A. Kent; Edward F. Sherer

[57] ABSTRACT

A method of reducing the permeability to water of a subterranean geological formation containing sandstone. The method is carried out by contacting the formation with an aqueous mixture comprising a water-soluble anionic polymer having a molecular weight greater than 100,000 and subsequently contacting the anionic polymer with a polymer stabilizing fluid comprising a water-soluble cationic polymer having a molecular weight greater than 1,000.

20 Claims, No Drawings

METHOD OF ALTERING THE PERMEABILITY OF A HYDROCARBON-CONTAINING SUBTERRANEAN FORMATION

BACKGROUND OF THE INVENTION

A. Field of the Invention

This invention relates to a method of treating a subterranean formation, containing silica, clay, or mixtures of silica and clay, of nonuniform permeability for the purpose of producing hydrocarbons from the subterranean formation, and more particularly, concerns a method of reducing the permeability to water of a subterranean formation penetrated by a well bore, and containing silica, clay, or mixtures of silica and clay, thereby reducing the quantity of water recovered from the subterranean formation and increasing the relative production rate of hydrocarbons from the formation.

B. Description of the Prior Art

The production of large amounts of water from oil wells and gas wells constitutes one of the major items of expense in the overall recovery of hydrocarbons from a subterranean formation. Many oil wells will produce a gross effluent comprising greater than 80% by volume water. Most of the pumping energy is therefore expended in lifting water from the well, and thereafter the production effluent must be put through expensive separation procedures in order to recover water-free hydrocarbons. The remaining water constitutes a troublesome and expensive disposal problem. It is therefore highly desirable to decrease the volume of water produced from oil and gas wells. By decreasing the flow of water into the well bore, another beneficial effect is obtained in that, at a given pumping rate, there will be a lower liquid level over the pump in the well bore, thus reducing the back pressure in the formation and improving pumping efficiency and net daily oil production.

Undesirable water, including brines, recovered from a well bore penetrating a subterranean formation can result from the infiltration of naturally-occurring subterranean water or, in the case of waterflood projects, from injection of brines or water. Either source of water leads to lowered efficiency in producing the desired hydrocarbons from the formation. In the application of waterflooding to hydrocarbon reservoirs, poor sweep efficiency often leads to disappointing results.

Anionic polymers, such as polyacrylamide, have been used in the past to reduce the amount of water production from oil or gas wells by means of injecting a solution of the polymer into a subterranean formation thereby reducing the effective water permeability of the formation. For example, U.S. Pat. No. 3,308,885 discloses introducing an aqueous solution of a water-soluble polyacrylamide polymer into a subterranean formation around a well bore to reduce the water/oil ratio of the formation effluent. The polymers have also been used to change the injectivity profile of water injection wells in order to make more efficient use of the water and to change the mobility of the injected water.

The polymers alter the permeability to water of the subterranean formation by absorbing into the surface of the rock in the formation. Although the polymers have been effective in reducing the amount of water recovered from a subterranean formation, certain problems remain. For instance, the polymers, while effective, have limited permanence which results in a treatment with a limited lifetime. It has been found that, when a subterranean formation has been treated with the polymers to reduce water production, substantial amounts of the polymers are removed from the formation by fluids that are produced or injected into the formation necessitating retreatment of the formation. Polymers that are not adequately attached to the surface of the rock are particularly susceptible to removal by these fluids. The use of a crosslinking agent with the polymer in such a treatment has not been completely successful in stabilizing the polymer in the formation and preventing its loss after treatment. An indicator of the instability of the polymers has been the results of treatments of producing wells over extended periods of time. In some instances, the benefits of the polymer treatment in reducing water production has been lost within three to six months or even sooner after the initial polymer treatment.

By the present invention, a method of treating a subterranean formation, containing silica, clay, or mixtures of silica and clay, is provided which improves the stability and long term effectiveness of anionic polymers which are utilized to reduce the permeability to water of the subterranean formation.

SUMMARY OF THE INVENTION

The method of the present invention resides in a method of reducing the permeability to water of a subterranean geological formation, principally comprised of silica, clay, or mixtures of silica and clay, penetrated by at least one well bore by contacting the formation with an aqueous mixture comprising a water-soluble anionic polymer having a molecular weight greater than 100,000 and subsequently contacting the water-soluble anionic polymer with a polymer stabilizing fluid comprising a water-soluble cationic polymer having a molecular weight greater than 1,000. Upon contact of the anionic polymer with the polymer stabilizing fluid, coacervation occurs between the anionic polymer and the cationic polymer present in the polymer stabilizing fluid which reduces the amount of the anionic polymer removed from the formation by means of fluids produced or injected into the formation.

The method of the invention can be used either for water diversion purposes in injection wells used for waterfloods or for hydrocarbon production wells for the purpose of reducing the water/oil ratio produced therefrom, e.g., reduce the permeability to water in the well bore area. The use of the method of the invention results in a treatment which is effective over extended periods of time.

DESCRIPTION OF THE PREFERRED EMBODIMENTS

The method of the invention is primarily directed to subterranean formations composed of sandstone and which are commonly referred to as sandstone formations. For purposes of the disclosure and claims, a sandstone formation is a formation which is primarily composed of silica, clay, or mixtures of silica and clay, and which may also contain calcareous constituents. For purposes of this disclosure, clay is a hydrated aluminum silicate having the general formula $Al_2O_3SiO_2.nH_2O$. Clay types include kaolinite, montmorillonite, attapulgite, illite, bentonite, halloysite, and mixtures thereof.

When used in the specification and the claims, unless otherwise specified, the term "polymer" is employed generically to include both homopolymers and copolymers; and the term "water-soluble polymers" is employed to include those polymers which are truly water-soluble and those which are dispersible in water or another aqueous medium to form stable colloidal suspensions which are capable of coacervation.

Anionic polymers suitable for use in the present invention include water-dispersible anionic polymers having a molecular weight greater than 100,000. Examples of such anionic polymers include gum karaya, gum tragacanth, gum ghatti, gum acacia, psyllium, carrageenan, xanthan gum, scleroglucan, carboxyalkyl guar wherein said alkyl group has from 1 to about 3 carbon atoms, carboxyalkylhydroxyalkyl guar wherein said alkyl groups have from 1 to about 3 carbon atoms, carboxyalkyl cellulose wherein said alkyl group has from 1 to about 3 carbon atoms, carboxyalkylhydroxyalkyl cellulose wherein said alkyl groups have from 1 to about 3 carbon atoms, polyacrylamide-type polymers, and mixtures thereof.

Examples of carboxyalkyl guars that can be used in carrying out the method of the invention include carboxymethyl guar and carboxyethyl guar. Suitable carboxyalkylhydroxyalkyl guars include carboxymethylhydroxyethyl guar, carboxyethylhydroxyethyl guar, carboxymethylhydroxypropyl guar and carboxyethylhydroxypropyl guar. Examples of carboxyalkyl cellulose that can be used in carrying out the method of the invention include carboxymethyl cellulose and carboxyethyl cellulose. Examples of carboxyalkylhydroxyalkyl cellulose are carboxymethylhydroxypropyl cellulose, carboxymethylhydroxyethyl cellulose, carboxyethylhydroxypropyl cellulose, and carboxyethylhydroxyethyl cellulose.

Any acrylamide-type polymer which is water-soluble can be used in the method of the present invention. Examples of such polymers include polyacrylamides, polymethacrylamide wherein up to about 75 percent of the carboxamide groups can be hydrolyzed to carboxyl groups, polyacrylic acid, polymethacrylic acid, polyacrylates wherein said carboxyl group contains an ammonium salt or an alkali metal salt such as sodium or potassium, polymers of N-substituted acrylamides wherein the nitrogens in the carboxamide groups can have from 1 to 2 alkyl substituents which contain one to four carbon atoms, copolymers of acrylamide with another ethylenically unsaturated monomer copolymerizable therewith, sufficient acrylamide being present in the monomer mixture to impart the water-soluble properties to the resulting copolymer when it is mixed with water and wherein up to 75 percent of the carboxamide groups can be hydrolyzed to carboxyl groups, and admixtures of the such polymers. Examples of suitable ethylenically unsaturated monomers include acrylic acid, methacrylic acid, vinyl acetate, acrylonitrile, vinyl benzene sulfonic acid, vinyl chlorides, maleic anhydride, and the like.

Preferably, the anionic polymer has a molecular weight greater than 500,000 and more preferably has a molecular weight in the range of from about 2,000,000 to about 10,000,000. The upper limit of molecular weight is unimportant so long as the polymer is water-soluble. Thus, it is within the scope of the invention to use anionic polymers having molecular weights as high as 20,000,000 or higher.

The preferred anionic polymer for use in the present invention has a molecular weight in the range of from about 4,000,000 to about 5,000,000 and comprises a copolymer containing about 70 to about 90 weight percent of acrylamide and about 10 to about 30 weight percent of acrylic acid.

The amount of anionic polymer used in preparing the aqueous mixture can vary widely depending on the particular anionic polymer desired, purity of the polymer, and the properties desired. Generally speaking, amounts in the range of from about 10 to about 10,000, preferably from about 100 to about 5,000, or more preferably about 750 to about 2,000 parts per million (ppm) of anionic polymer are included in the aqueous mixture. Amounts outside this range can also be used. Small amounts of anionic polymer will usually produce liquid mobile gels which can be readily pumped while large amounts of polymer will usually produce thick, viscous, somewhat elastic gels. The thick gels can be thinned by the dissolution of water to any desired concentration of anionic polymer and this can be done by mechanical means such as stirring, pumping, or by means of a suitable turbulence enducing device which does not cause shearing of the anionic polymer. Thus, there is really no fixed lower or upper amount of the anionic polymer which can be used.

Cationic polymers suitable for use in the polymer stabilizing fluid can be generally described as water-soluble cationic polymers having a molecular weight of at least 1,000. Examples of the cationic polymers include polyethylenimine, a copolymer of epichlorohydrin and dimethyl amine, polydimethyldiallylammonium polymer and polymers and copolymers having monomer repeat units of the following general formula:

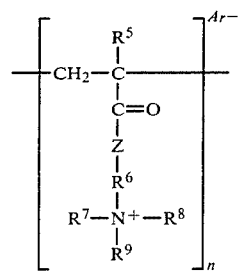

wherein
$R^5$ is selected from the group consisting of hydrogen and methyl;

Z is selected from the group consisting of oxygen and NH;

$R^6$ is selected from the group consisting of an unsubstituted alkylene group having from about 2 to about 6 carbon atoms and a substituted alkylene group having from about 2 to about 6 carbon atoms and containing at least one hydroxyl group, such as ethylene, propylene, and 2-hydroxypropylene;

$R^7$ and $R^8$ are independently selected from the group consisting of hydrogen, methyl, and ethyl;

$R^9$ is selected from the group consisting hydrogen, methyl; ethyl; —$R^{10}(CH_2CH_2O)_mR^{11}$
wherein $R^{10}$ can be either nonexistent or can be selected from the group consisting of an unsubstituted alkylene group having from about 2 to about 6 carbon atoms and a substituted alkylene group having from about 2 to about 6 carbon atoms and containing at least one hydroxyl group, $R^{11}$ is selected from the group consisting of hydrogen and methyl, and m is an integer from about 2 to about 500, preferably about 10 to about 200, and most preferably about 100; and a group having the general formula:

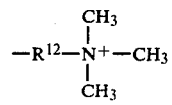

wherein

R$^{12}$ is selected from the group consisting of an unsubstituted alkylene group having from about 2 to about 6 carbon atoms and a substituted alkylene group having from about 2 to about 6 carbon atoms and containing at least one hydroxyl group;

A$^-$ is a compatible anion such as chlorine, bromine, iodine, sulfate, hydroxyl, and methyl sulfate;

r is an integer equal to the number of anions required to maintain electronic neutrality; and n is an integer equal to the number of monomer units in the polymer required to achieve a molecular weight greater than 1,000.

Preferably the cationic polymers are polymers and copolymers having monomer repeat units of the following general formula:

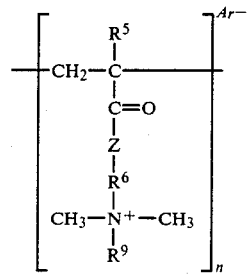

wherein
R$^6$ ethylene, propylene, or 2-hydroxypropylene;
R$^9$ is

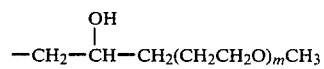

wherein m is about 10 to about 200 or

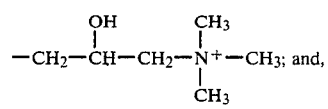

A$^-$, r, n, R$^5$ and Z have the same values as formula I.

Examples of particularly preferred cationic polymers which are suitable for use in the present invention include polymers and copolymers containing the following monomer repeat units:

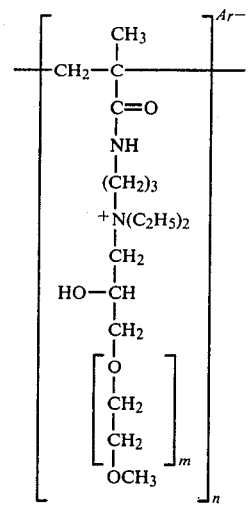

wherein m is 10 to 200;

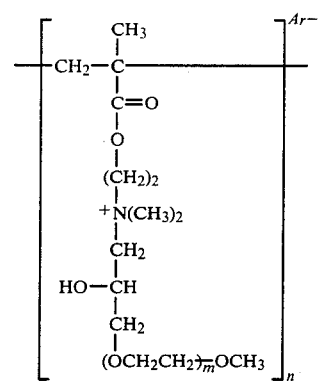

wherein m is 10 to 200;

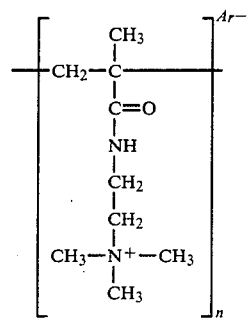

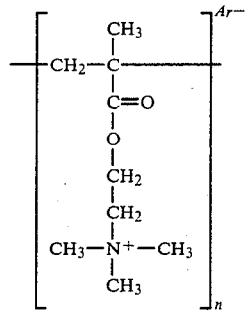

-continued

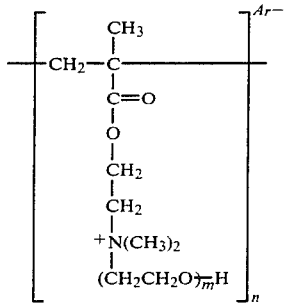

wherein m is 10 to 200;

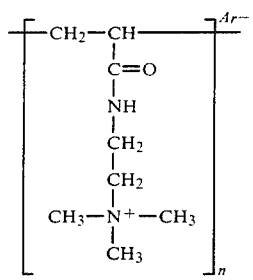

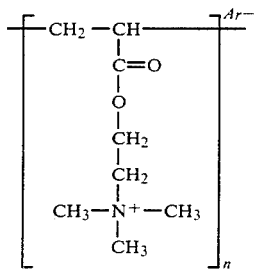

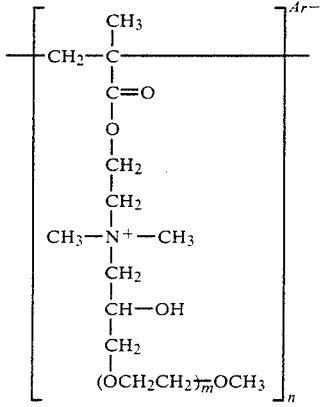

wherein m is 10 to 200;

VII. 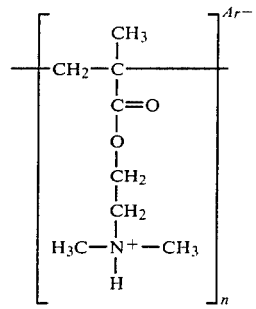

VIII. 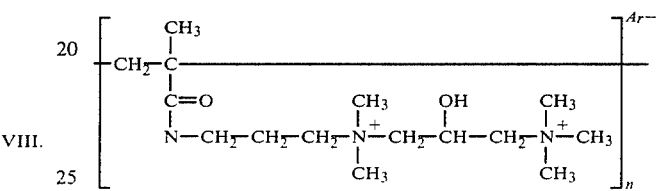

IX. 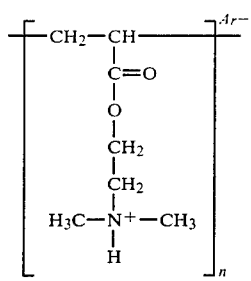

XI.

XII.

XIII.

X.

A preferred cationic polymer for use in the method of the present invention is a copolymer having the following formula:

XIV.

wherein monomer unit S is preferably present in an amount of from about 50 percent to about 90 percent by weight of the copolymer and monomer unit T is preferably present in an amount of from about 10 percent to about 50 percent by weight of the copolymer.

In addition, the copolymer represented by formula XIV preferably further comprises up to 10 per cent by weight acrylic acid.

In Formulae II through XIV, $A^-$, r, and n have the same meaning as they hold in Formula I.

The amount of cationic polymer used in preparing polymer stabilizng fluid can vary widely depending on the particular cationic polymer desired, purity of the polymer, and the properties desired. Generally speaking, amounts in the range of from about 10 to about 100,000, and preferably from about 100 to about 10,000 parts per million of cationic polymer are present in the polymer stabilizing fluid. Amounts outside this range can also be used.

The molecular weight of the cationic polymers used in the polymer stabilizing fluid will vary over a wide range depending on the permeability of the formation to be treated and the anionic polymer used in the aqueous mixture. Generally speaking, the cationic polymers should have a molecular weight of at least about 1,000 to about 5,000,000. Preferably, the cationic polymers have a molecular weight in the range of from about 5,000 to about 1,000,000.

The amount of cationic polymer used in the practice of the invention will be an amount which is effective or sufficient to cause coacervation or gelation with the anionic polymer which is present in the aqueous mixture and thus prevent the anionic polymer from becoming unattached or washing off from the rock in the portion of the formation being treated. The lower limit of the amount of cationic polymer will depend upon several factors including the particular type of anionic polymer and cationic polymer utilized, the concentration of the anionic polymer or polymers in the water, the water which is used, and the degree of coacervation desired. For similar reasons, the upper limit of the amount of cationic polymer used in the practice of the invention also cannot always be defined. However, as a general guide, the amount of cationic polymer used in the practice of the invention will be in the range of from about 1 to about 100, and preferably 10 to 50 weight percent of the amount of anionic polymer present in the aqueous mixture used. However, in some situations, it may be desirable to use amounts of cationic polymer which are outside the above ranges. Such use is within the scope of the invention. Those skilled in the art can determine the amount of cationic polymer to be used by simple experiments carried out in light of this disclosure.

The word "water" is used generically herein and in the claims, unless otherwise stated, to include brines, fresh water, and other aqueous media.

The present invention is carried out by first contacting the water-producing interval of the sandstone formation with the aqueous mixture containing the water-soluble anionic polymer, preferably through a well bore, whereby the anionic polymer contacts the desired portion of the subterranean formation. Next, the anionic polymer present in the formation is contacted by the polymer stabilizing fluid. An aqueous spacer fluid, such as fresh water or brine, can be interspaced between the aqueous mixture and the polymer stabilizng fluid. If brine is utilized as the spacer fluid, the brine should have a solids content no greater than 200,000 ppm. The volume of the aqueous mixture used in the method of the present invention will vary depending on the formation to be treated. For example, the volume can range from about 500 to about 5,000 barrels and amounts outside this range.

A crosslinking composition can be utilized in the method of the invention. The crosslinking composition can be incorporated into the aqueous mixture containing the anionic polymer or can contact the anionic polymer after the polymer has contacted the formation but prior to the anionic polymer being contacted with the polymer stabilizing fluid. Crosslinking agents which are suitable for use in the method of the invention are known to persons skilled in the art and include multivalent metal cations such as $Fe^{2+}$, $Fe^{3+}$, $Al^{3+}$, $Ti^{4+}$, $Zn^{2+}$, $Sn^{4+}$, $Zr^{4+}$, $Ca^{2+}$, $Mg^{2+}$, $Cr^{3+}$ and a retarding anion selected from the group consisting of acetate, nitrilotriacetate, tartrate, citrate, and phosphate. A particularly useful crosslinking agent for use in the invention is a crosslinking composition containing a zirconium compound, an alphahydroxy acid, and an amine compound. This crosslinking agent is disclosed in U.S. Pat. No. 4,460,751, which is hereby incorporated by reference.

The reduced water production achieved through the method of the invention is the result of the sequential steps of introducing into a formation (a) the first aqueous mixture, (b) optionally, the spacer fluid, and (c) the polymer stabilizing fluid. The sequence of steps (a), (b), and (c) can be repeated.

Following the injection of the polymer stabilizing fluid into the formation, the well can be placed back on production under the conditions that were employed prior to treatment. A substantial reduction in the water/hydrocarbon ratio of the well effluent is achieved due primarily to a reduced flow rate of water into the well bore. Although the immediate effect of the method of the invention is to decrease the quantity of water recovered from a well bore penetrated subterranean formation, a secondary effect is increasing the absolute daily production rate of hydrocarbons due to the reduced back pressure on the formation.

The following examples will serve to more comprehensively illustrate certain specific embodiments of the invention, but are not intended to be construed so as to be restrictive of the spirit and scope thereof.

EXAMPLES

A series of tests were carried out using the method of the present invention. The anionic and cationic polymers utilized in these tests are summarized in Tables I and II.

TABLE I

| ANIONIC POLYMERS | |
|---|---|
| Polymer Designation | Polymer (M.W.) |
| A1 | polyacrylamide (7,000,000) |
| A2 | carboxymethyl cellulose (1,000,000) |
| A3 | xanthan gum (2,000,000–3,000,000) |

TABLE II

| CATIONIC POLYMERS | |
|---|---|
| Polymer Designation | Polymer (M.W.) |
| C1 | The cationic polymer set forth in formula XIV and further including 10 percent by weight acrylic acid. (500,000) |
| C2 | The cationic polymer set forth in formula |

TABLE II-continued

| Polymer Designation | CATIONIC POLYMERS Polymer (M.W.) |
|---|---|
|  | VI. (400,000) |
| C3 | Polyethyleneimine. (600,000) |
| C4 | A copolymer of epichlorohydrin and dimethyl amine. (20,000) |

The tests were conducted to determine the permeability to water of a Filtros core having a diameter of 2.38 cm. and a length of 2.50 cm. before and after treatment with the method of the invention. The Filtros core contained about 80 percent by weight $Al_2O_3$ (corundum) and about 20 percent by weight $Al_6SiO_{13}$ (mullite). The tests were carried out by the following steps:

A. Pump through a first end of the core a 6 percent potassium chloride solution until a constant flow rate was achieved.
B. Pump through a second end of the core which is opposite to the first end at a constant flow rate, various amounts of an aqueous mixture containing various concentrations of anionic polymer. The aqueous mixture passed through a core wafer having a diameter of 2.38 cm. and a length of 1.27 cm. prior to passing through the Filtros core.
C. Pump through the second end of the core and the wafer, at a constant flow rate, 10 ml of a 6 percent by weight potassium chloride solution.
D. Pump through the second end of the core and the wafer, at a constant flow rate, various amounts of a polymer stabilizing fluid containing various concentrations of cationic polymer.
E. Pump through the first end of the core, at a constant flow rate, a 6 percent by weight potassium chloride solution until permeability variation ceased.

The results of these tests were measured in residual resistance factor (RRF).

$$RRF = \frac{\text{permeability before treatment}}{\text{permeability after treatment}}$$

The results of these tests are shown in Table III.

TABLE III

| Test No. | Anionic Polymer (ppm) [ml] | Cationic Polymer (ppm) [ml] | RRF |
|---|---|---|---|
| 1. | A1 (100) [10] | — | 1.0 |
| 2. | — | C4 (100) [5] | 0.9 |
| 3. | A1 (100) [10] | C2 (100) [5] | 8.7 |
| 4. | A2 (1,000) [15] | — | 1.1 |
| 5. | — | C3 (1,000) [10] | 0.9 |
| 6. | A2 (1,000) [15] | C3 (1,000) [10] | 2.2 |
| 7. | A3 (100) [10] | — | 1.0 |
| 8. | — | C1 (10) [5] | 1.0 |
| 9. | A3 (100) [10] | C4 (100) [5] | 1.1 |
| 10. | A1 (100) [10] | C1 (10) [5] | 2.4 |
| 11. | — | C2 (100) [5] | 1.1 |

The results of these tests show that the method of the invention was very effective in reducing the permeability of the core to water.

Although the invention has been described in conjunction with preferred and alternate embodiments thereof, it is evident that many alternatives, modifications, and variations of the invention will be apparent to those skilled in the art in light of the foregoing description. Accordingly, it is intended to embrace within the invention all such alternatives, modifications, and variations that fall within the spirit and scope of the appended claims.

What is claimed is:

1. A method of reducing the permeability to water of a subterranean formation containing sandstone comprising the steps of:
    (a) contacting said formation with an aqueous mixture containing a water-soluble anionic polymer having a molecular weight greater than 100,000 and which is substantially absent any cationic polymer capable of interaction with such anionic polymer; and
    (b) contacting said water-soluble anionic polymer with a polymer stabilizing fluid comprising an aqueous solution of a water-soluble cationic polymer having a molecular weight greater than 1,000 which is substantially absent any anionic polymer capable of interaction with such cationic polymer.

2. The method recited in claim 1 wherein said water-soluble anionic polymer is selected from the group consisting of gum karaya, gum tragacanth, gum ghatti, gum acacia, psyllium, carrageenan, xanthan gum, scleroglucan, carboxyalkyl guar wherein said alkyl group has from 1 to about 3 carbon atoms, carboxyalkylhydroxyalkyl guar wherein said alkyl groups have from 1 to about 3 carbon atoms, carboxyalkyl cellulose wherein said alkyl group has from 1 to about 3 carbon atoms, carboxyalkylhydroxyalkyl cellulose wherein said alkyl groups have from 1 to about 3 carbon atoms, polyacrylamide-containing polymers, polyacrylate-containing polymers and mixtures thereof.

3. The method recited in claim 2 wherein said water-dispersible cationic polymer is selected from the group consisting of polyethylenimine, a copolymer of epichlorohydrin and dimethyl amine, polydimethyldiallylammonium polymer, polymers and copolymers having monomer repeat units of the following general formula:

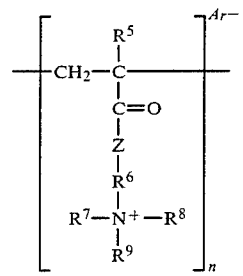

wherein
$R^5$ is selected from the group consisting of hydrogen and methyl;
Z is selected from the group consisting of oxygen and NH;
$R^6$ is selected from the group consisting of an unsubstituted alkylene group having from about 2 to about 6 carbon atoms and a substituted alkylene group having from about 2 to about 6 carbon atoms and containing at least one hydroxyl group;
$R^7$ and $R^8$ are independently selected from the group consisting of hydrogen, methyl, and ethyl;
$R^9$ is selected from the group consisting of hydrogen, methyl, ethyl, $-R^{10}(CH_2CH_2O)_mR^{11}$;
    wherein $R^{10}$ can be either nonexistent or can be selected from the group consisting of an unsubstituted alkylene group having from about 2 to about 6 carbon atoms and a substituted alkylene group having from about 2 to about 6 carbon atoms and containing at least one hydroxyl group and $R^{11}$ is selected from the group consisting of hydrogen and methyl; and m is an integer from 2 to 500; and a group having the general formula:

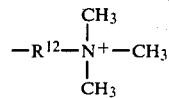

wherein
$R^{12}$ is selected from the group consisting of an unsubstituted alkylene group having from about 2 to about 6 carbon atoms and a substituted alkylene group having from about 2 to about 6 carbon atoms;
$A^-$ is a compatible anion;
r is an integer equal to the number of anions required to maintain electronic neutrality; and
n is an integer equal to the number of monomer units in the polymer required to achieve a molecular weight from about 1,000 to about 5,000,000.

4. The method recited in claim 3 wherein said anionic polymer comprises a copolymer containing about 70 to about 90 weight percent of acrylamide and about 10 to about 30 weight percent of acrylic acid.

5. The method recited in claim 4 wherein said cationic polymers are polymers and copolymers having monomer repeat units of the following general formula:

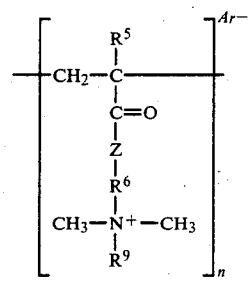

wherein
$R^5$ is hydrogen or methyl;
Z is oxygen or NH;
$R^6$ is ethylene, propylene, or 2-hydroxypropylene;
$R^9$ is

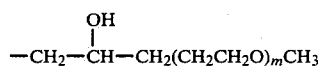

wherein m is about 10 to about 200 or

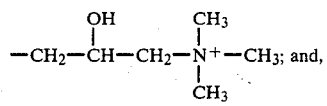

$A^-$ is selected from the group consisting of chlorine, bromine, iodine, sulfate, hydroxyl, and methyl sulfate;

r is an integer equal to the number of anions required to maintain electronic neutrality; and
n is an integer equal to the number of monomer units in the polymer required to achieve a molecular weight greater than about 5,000.

6. The method recited in claim 5 wherein from about 100 to about 5,000 ppm of anionic polymer are included in the aqueous mixture.

7. The method recited in claim 6 wherein said anionic polymer has a molecular weight in the range of from about 2,000,000 to about 10,000,000.

8. The method recited in claim 7 wherein said cationic polymer is a copolymer having the following formula:

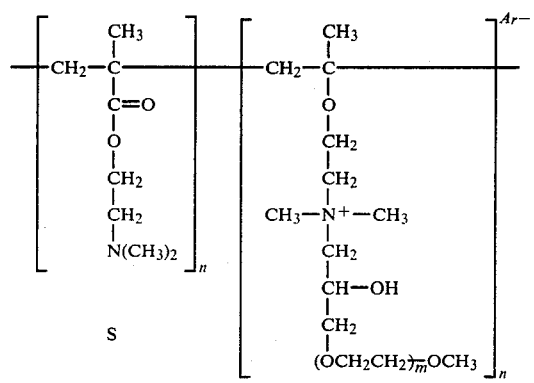

wherein monomer unit S is present in an amount of from about 50 percent to about 90 percent by weight of the copplymer and monomer unit T is present in an amount of from about 10 percent to about 50 percent by weight of the copolymer and said copolymer further includes up to 10 percent by weight of acrylic acid.

9. The method recited in claim 8 wherein from about 100 to about 10,000 ppm of the cationic polymer are present in the polymer stabilizing fluid.

10. The method recited in claim 9 wherein said cationic polymer has a molecular weight in the range of from about 5,000 to about 1,000,000.

11. The method recited in claim 10 wherein said cationic polymer is present in an amount in the range of from about 10 to about 50 percent by weight of anionic polymer.

12. The method recited in claim 11 wherein said method further comprises the step of contacting the formation with an aqueous spacer fluid after step (a) and prior to step (b).

13. The method recited in claim 12 wherein a crosslinking composition is admixed with the aqueous mixture.

14. A method of treating a subsurface oil and water-producing interval of a subterranean formation containing sandstone to decrease the volume of water to oil produced therefrom comprising the steps of:
(a) contacting said formation with an aqueous mixture containing a water-soluble anionic polymer selected from the group consisting of gum karaya, gum tragacanth, gum ghatti, gum acacia, psyllium, carrageenan, xanthan gum, scleroglucan, carboxyalkyl guar wherein said alkyl group has from 1 to about 3 carbon atoms, carboxyalkylhydroxyalkyl guar wherein said alkyl groups have from 1 to about 3 carbon atoms, carboxyalkyl cellulose wherein said alkyl group has from 1 to about 3 carbon atoms, carboxyalkylhydroxyalkyl cellulose wherein said alkyl groups have from 1 to about 3 carbon atoms, polyacrylamide-containing polymers, polyacrylate-containing polymers, and mixtures thereof; and, (b) contacting said anionic polymer with a polymer stabilizing fluid comprising a water-soluble cationic polymer selected from the group consisting of polyethylenimine, a copolymer of epichlorohydrin and dimethylamine, polydimethyldiallylammonium polymer, polymers and copolymers having monomer repeat units of the following general formula:

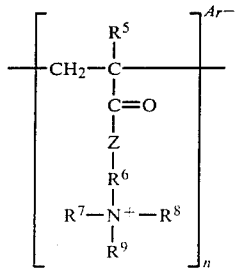

wherein
$R^5$ is selected from the group consisting of hydrogen and methyl;
Z is selected from the group consisting of oxygen and NH;
$R^6$ is selected from the group consisting of an unsubstituted alkylene group having from about 2 to about 6 carbon atoms and a substituted alkylene group having from about 2 to about 6 carbon atoms and containing at least one hydroxyl group;
$R^7$ and $R^8$ are independently selected from the group consisting of hydrogen, methyl and ethyl;
$R^9$ is selected from the group consisting of hydrogen, methyl, ethyl, $-R^{10}(CH^2CH_2O)_m R^{11}$;
  wherein $R^{10}$ can be either nonexistent or can be selected from the group consisting of an unsubstituted alkylene group having from about 2 to about 6 carbon atoms and a substituted alkylene group having from about 2 to about 6 carbon atoms and containing at least one hydroxyl group and $R^{11}$ is selected from the group consisting of hydrogen and methyl; and m is an integer from 2 to 500; and
a group having the general formula:

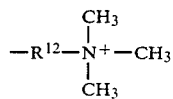

wherein
$R^{12}$ is selected from the group consisting of an unsubstituted alkylene group having from about 2 to about 6 carbon atoms and a substituted alkylene group having from about 2 to about 6 carbon atoms;
$A^-$ is a compatible anion;
r is an integer equal to the number of anions required to maintain electronic neutrality; and n is an integer equal to the number of monomer units in the polymer required to achieve a molecular weight greater than 1,000.

15. The method recited in claim 14 wherein said anionic polymer comprises a copolymer containing about 70 to about 90 weight percent of acrylamide and about 10 to about 30 weight percent of acrylic acid.

16. The method recited in claim 15 wherein said cationic polymers are polymers and copolymers having monomer repeat units of the following general formula:

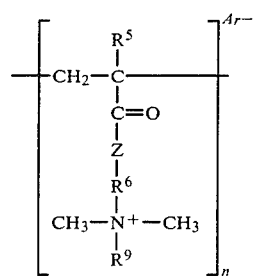

wherein
$R^5$ is hydrogen or methyl;
Z is oxygen or NH;
$R^6$ is ethylene, propylene, or 2-hydroxypropylene;
$R^9$ is

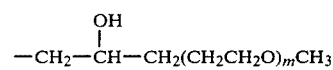

wherein m is about 10 to about 200 or

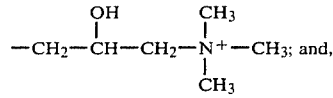

$A^-$ is selected from the group consisting of chlorine, bromine, iodine, sulfate, hydroxyl, and methyl sulfate;
r is an integer equal to the number of anions required to maintain electronic neutrality; and n is an integer equal to the number of monomer units in the polymer required to achieve a molecular weight greater than about 5,000.

17. The method recited in claim 16 wherein said anionic polymer has a molecular weight in the range of from about 2,000,000 to about 10,000,000.

18. The method recited in claim 17 wherein said cationic polymer has a molecular weight in the range of from about 5,000 to about 1,000,000.

19. The method recited in claim 18 wherein said cationic polymer is present in an amount in the range of from about 10 to about 50 percent by weight of anionic polymer.

20. The method recited in claim 19 wherein said cationic polymer is a copolymer having the following formula:

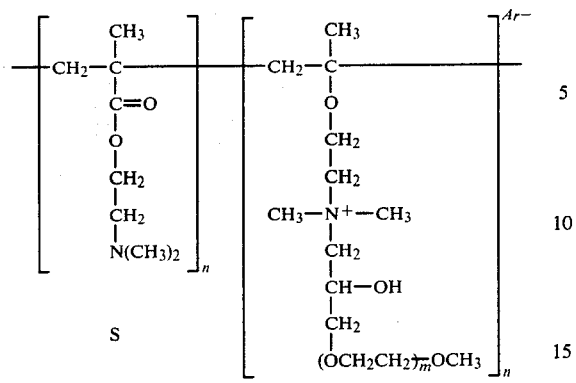
monomer unit S is present in an amount of from about 50 percent to abut 90 percent by weight of the copolymer and monomer unit T is present in an amount of from about 10 percent to aobut 50 percent by weight of the copolymer and said copolymer further includes up to 10 percent by weight of acrylic acid.
* * * * *